(12) United States Patent
Backman et al.

(10) Patent No.: US 8,789,709 B2
(45) Date of Patent: Jul. 29, 2014

(54) FLOW DEFLECTING MEMBER FOR HYDROCYCLONE

(75) Inventors: Jan Backman, Jarfalla (SE); Valentina Kucher, Grodinge (SE); Björn Tidbeck, Stockholm (SE)

(73) Assignee: Ovivo Luxembourg S.à.r.l., Luxembourg (LU)

( * ) Notice: Subject to any disclaimer, the term of this patent is extended or adjusted under 35 U.S.C. 154(b) by 0 days.

(21) Appl. No.: 14/115,537

(22) PCT Filed: May 3, 2012

(86) PCT No.: PCT/SE2012/050453
§ 371 (c)(1),
(2), (4) Date: Jan. 14, 2014

(87) PCT Pub. No.: WO2012/150901
PCT Pub. Date: Nov. 8, 2012

(65) Prior Publication Data
US 2014/0124437 A1    May 8, 2014

(30) Foreign Application Priority Data
May 5, 2011 (SE) ...................................... 1150397

(51) Int. Cl.
*B04C 5/103* (2006.01)
*B04C 5/081* (2006.01)
*B01D 17/038* (2006.01)
*B01D 21/26* (2006.01)
*D21D 5/24* (2006.01)
*B01D 17/02* (2006.01)

(52) U.S. Cl.
CPC ................. *B04C 5/103* (2013.01); *B04C 5/081* (2013.01); *B01D 17/0217* (2013.01); *B01D 21/267* (2013.01); *D21D 5/24* (2013.01)
USPC .......................... 210/512.1; 209/727; 209/733

(58) Field of Classification Search
CPC .. B01D 17/0217; B01D 21/267; B04C 5/081; B04C 5/103; D21D 5/24
USPC ................. 210/512, 1; 209/727, 733
See application file for complete search history.

(56) References Cited

U.S. PATENT DOCUMENTS

| | | | | |
|---|---|---|---|---|
| 4,153,558 A | * | 5/1979 | Frykhult | 210/512.1 |
| 5,437,794 A | * | 8/1995 | Andersson | 210/512.1 |
| 8,205,756 B2 | * | 6/2012 | Backman | 210/512.1 |

FOREIGN PATENT DOCUMENTS

| | | |
|---|---|---|
| EP | 0972573 A1 | 1/2000 |
| JP | 2001121010 A | 5/2001 |
| SU | 1289555 A2 | 2/1987 |
| WO | 2005110608 A1 | 11/2005 |

OTHER PUBLICATIONS

The Written Opinion for PCT/SE2012/050453, Jun. 2012.*

* cited by examiner

*Primary Examiner* — David A Reifsnyder
(74) *Attorney, Agent, or Firm* — James Earl Lowe, Jr.

(57) ABSTRACT

A hydrocyclone (1) for separating a liquid mixture into a heavy fraction including heavy particles and a light fraction, comprising a housing (2) forming an elongated separation chamber (3) having a circumferential wall (4), a base end (5), an apex end (6), at least one inlet member (7) for supplying a liquid mixture into the separation chamber (3), at least one of the inlet member/s (7) positioned at the base end (5), a first outlet member (8) for discharging separated light fraction from the separation chamber (3) at the base end (5), a second outlet member (9) for discharging separated heavy fraction from the separation chamber (3) at the apex end (6), means (10) for supplying the liquid mixture to the separation chamber (3) via the at least one inlet member (7), so that during operation a liquid stream is generated as a helical vortex (11) about a center axis (12) in the separation chamber (3), said helical vortex (11) extending from the base end (5) to the apex end (6), a first flow deflection means arranged in the circumferential wall (4) which comprises at least one member (14) in the path 13 of the liquid stream showing a decrease of the radius of the separation chamber, followed by an increase of the radius of the separation chamber, where in the at least one member comprises a rounded curve portion 14a for transporting the heavy particles.

16 Claims, 4 Drawing Sheets

A-A

B-B

US 8,789,709 B2

FLOW DEFLECTING MEMBER FOR HYDROCYCLONE

TECHNICAL FIELD

The present invention concerns a hydrocyclone with flow deflection means for creating a controlled turbulence and avoiding re-mixing of separated heavy particles into an accept stream of light accept fibres. In more detail, a hydrocyclone for separating a liquid mixture in a heavy fraction and a light fraction, comprising a housing forming an elongated separation chamber having a circumferential wall, a base end and an apex end. The housing having at least one inlet member for supplying a liquid mixture into the separation chamber where at least one of the inlet member/-s is positioned at the base end, at least one first outlet member for discharging separated light fraction from the separation chamber at the base end, and a second outlet member for discharging separated heavy fraction from the separation chamber at the apex end.

It is also provided means for supplying the liquid mixture to the separation chamber via the at least one inlet member, so that during operation a liquid stream is generated as a helical vortex about a centre axis in the separation chamber, said helical vortex extending from the base end to the apex end. At least one flow deflection means for creating controlled turbulence and avoiding re-mixing of separated heavy particles into an accept stream of light accept fibres is provided in the smooth circumferential wall at least over a portion of the separation chamber, which comprises at least one member in the path of the liquid stream in the circumferential wall, showing a decrease of the radius of the separation chamber, followed by an increase of the radius of the separation chamber, wherein the at least one member comprises a rounded curve portion, a rack portion and a ledge portion.

BACKGROUND ART

In the pulp and paper industry hydrocyclones are widely used for cleaning fibre suspensions from undesired particles and pollutants, most commonly heavy particles. Thus the fibre suspension is separated into a heavy fraction containing, said undesired heavy particles and a light fraction containing fibres.

In the definition of undesired heavy particles, this comprises particles having higher density compared with the accepted fibres, such as sand, grit, metal, coating flakes and high density plastics. But the undesired particles could also be organic particles originating from wood sources, for example various bark particles, shives, chops, resin particles, vessels and thick wall coarse fibres. The latter ones could have equal density as accepted fibres but is separated due to its lower specific surface.

A typical hydrocyclone plant for this purpose has hydrocyclones arranged in cascade feedback stages.

In order to keep the number of feedback stages down it is important to separate with as high selectivity as possible within each hydrocyclone, i.e. minimize the fibre portion separated and discharged through a heavy fraction outlet of each hydrocyclone, without reducing the share of undesired particles. It is also important to reduce the fibre concentration in the heavy fraction outlet in order to avoid clogging of the heavy fraction outlet at the apex and obtain secure operation conditions. A smooth inside surface of the hydrocyclone may be used to obtain a good dirt removal, as this allows the particles to migrate to the hydrocyclone wall with as moderate disturbing turbulence as possible. However, this will at the same time increase the amount of rejected fibres that settles towards the hydrocyclone wall. Thus, the Thickening factor Tf, $$Tf = Rm/Rv$$

where Rm is Reject share by mass (ratio of fibres) and Rv is Reject share by volume (ratio of the flow) taken out at the heavy fraction outlet, is large for hydrocyclones with smooth inner surfaces. A high Tf is not wanted as it greatly increases the risk of operational problems including fibres blocking the reject outlet, high fiber losses towards the reject outlet, locally higher fibre consistencies resulting in fibre networks or flocks that traps the heavy particles that is to be separated. A high Tf will further result in higher costs due the fibre reject losses or alternatively, in an aim to resolve the problem, due to higher energy and investment costs by using cascade coupled hydrocyclones for fibre recovery purposes. Consequently an aim is to minimize the thickening factor Tf.

In order to minimize the Thickening factor of a hydrocyclone, means for creating turbulence may be provided in the separation chamber. Such examples are described in, for example, EP 615469B1. Such means for creating turbulence may be a step where the radius of the inside wall of the separation chamber suddenly increases, which causes a turbulent flow expanding flocks of fibres and releasing undesired particles from the fibre network often forming close to the wall of the separation chamber. The steps are parallel with the centre axis of the hydrocyclone.

But there is a need of balancing so that the creating of a turbulent flow expanding fibre flocks will not disturb the helical vortex separating the undesired particles so that the separation efficiency of the hydrocyclone will not be diminished by for instance a larger share of remixing of either unseparated or remixing of already separated heavy particles into the hydrocyclone accept stream of light accept fibres. Due to the sudden increase of the radius in EP615469 there is a substantial risk that the already separated heavy particles are again remixed with the light fraction.

Another known hydrocyclone having means for creating turbulence is Celleco Cleanpac 130 made and sold by GL&V Sweden AB. It has a helical path in the circumferential wall of the separation chamber, along a portion of the separation chamber, in the same direction as a helical vortex of the liquid stream when in use. The means for creating turbulence is the similar as in EP 615469 B 1, i.e. the helical path shows a sudden increase in radius of the separation chamber, one per revolution of the helical path and parallel with the centre axis.

A further known hydrocyclone is described U.S. Pat. No. 4,153,558, having axially oriented guide bars. Although these guide bars have a decreasing radius in the separation chamber, their extensive lengths in an axial direction disturb the helical vortex and the separation efficiency is decreased. Additionally, the fact that the guide bars are axially oriented and lack any components in the direction of the liquid stream further prevents the hydrocyclones capability to transport the heavy particles towards the reject outlet.

SUMMARY OF INVENTION

An object of the present invention is to alleviate the disadvantages of the prior art and to provide an improved hydrocyclone for separating a liquid mixture into a heavy fraction including heavy particles, and a light fraction.

According to one embodiment of the invention, the hydrocyclone comprises a housing 2 forming an elongated separation chamber 3 having a circumferential wall 4, a base end 5, an apex end 6, at least one inlet member 7 for supplying a liquid mixture into the separation chamber 3, at least one of the inlet member/s 7 positioned at the base end 5, a first outlet member 8 for discharging separated light fraction from the separation chamber 3 at the base end 5, a second outlet member 9 for discharging separated heavy fraction from the separation chamber 3 at the apex end 6, means 10 for supplying the liquid mixture to the separation chamber 3 via the at least one inlet member 7, so that during operation a liquid stream is generated as a helical vortex 11 about a centre axis 12 in the separation chamber 3, said helical vortex 11 extending from the base end 5 to the apex end 6, a first flow deflection means arranged in the circumferential wall 4 which comprises at least one member 14 in the path 13 of the liquid stream showing a decrease of the radius of the separation chamber, followed by an increase of the radius of the separation chamber, wherein the at least one member comprises a rounded curve portion for transporting the heavy particles.

According to one embodiment, the rounded curve portion 14a is defined by a radius r, corresponding to the radius of the rounded curve at a specific point along the rounded curve portion 14a, wherein the radius r is preferably in the interval of $0.1 D_0 < r < D_0$, where $D_0$ is the diameter of the hydrocyclone housing at the position where the flow deflection means is arranged.

According to one embodiment, the rounded curve portion (14a) is connected to a rack portion (14b) essentially extending in the direction of the path (13) of the liquid stream.

According to one embodiment, the rounded curve portion (14a) is defined by an angle μ, corresponding to the angle between the radii as defined in the starting point of the rounded curve at the end of the rack portion 14b and the ending point of the rounded curve portion at the beginning of ledge portion 14c, wherein the angle μ is in the interval $0° < \mu < 120$, preferably in the interval $15° < \mu < 120°$, more preferably in the interval $30° < \mu < 90°$.

According to one embodiment, the rounded curve portion (14a) is connected to a ledge portion (14c) essentially extending in a direction towards the apex end (6) of the hydrocyclone (1).

According to one embodiment, an angle α between the tangent of the end of rack portion (14b) and a plane normal to the centre axis (12) is in the interval $-15° < \alpha < 80°$.

According to one embodiment, an angle α between the tangent of the end of the ledge portion (14c) and a plane extending through the centre axis (12) is in the interval $-15° < \beta < 60$.

According to one embodiment, the first flow deflection means comprises a plurality of members (14) arranged at the same level in the housing and connected by a smooth surface portion (16) of the circumferential wall (4).

According to one embodiment, each member (14) has an extension length along the circumferential wall (4) that is less than ¼ of the total circumference of the circumferential wall (4) measured at the axial position of the member (14).

According to one embodiment, the first flow deflection means is arranged at the apex end (6).

According to one embodiment, a second flow deflection means is arranged at a distance L1 from the first means measured along the centre axis (12), wherein the distance L1 is in the interval $0.8D1 < L1 < 4D1$, where D1 is the diameter of the hydrocyclone housing 2 at the position where the second means for flow deflection is arranged.

According to one embodiment, the ledge portion 14c has a curvature (17) corresponding to a radius R of a circle, wherein the radius R is preferably larger than r.

According to one embodiment, the ledge portion 14c is defined by three radii R1-R3 when viewed from an axial direction, wherein $R1 < D/2$, where D is the diameter of the hydrocyclone housing 2 at the position where the flow deflecting means is arranged, and $R2 < R1$ and $R3 < R2$.

According to one embodiment, the ledge portion 14c is defined by a radius R1 when viewed from an axial direction, wherein $R1 < D/2$, where D is the diameter of the hydrocyclone housing 2 at the position where the flow deflection means is arranged, wherein an edge 26 interconnects radius R1 with an essentially flat portion 27 that is connected to the circumferential wall 4, and wherein an angle Ω is defined as the extension direction of the portion 27 to an imaginary radial line extending from the center of the housing 2 through edge 26, wherein Ω preferably is in the interval $-45° < \Omega < 45°$.

Another object of the invention is to alleviate the disadvantages of the prior art and to provide an improved hydrocyclone for separating a liquid mixture into a heavy fraction, and a light fraction According to one embodiment of the invention, the hydrocyclone comprises a housing 2 forming an elongated separation chamber 3 having a circumferential wall 4, a base end 5, an apex end 6, at least one inlet member 7 for supplying a liquid mixture into the separation chamber 3, at least one of the inlet member/s 7 positioned at the base end 5, a first outlet member 8 for discharging separated light fraction from the separation chamber 3 at the base end 5, a second outlet member 9 for discharging separated heavy fraction from the separation chamber 3 at the apex end 6, means 10 for supplying the liquid mixture to the separation chamber 3 via the at least one inlet member 7, so that during operation a liquid stream is generated as a helical vortex 11 about a centre axis 12 in the separation chamber 3, said helical vortex 11 extending from the base end 5 to the apex end 6, a first flow deflection means arranged in the circumferential wall 4 which comprises at least one member 14 in the path 13 of the liquid stream showing a decrease of the radius of the separation chamber, followed by an increase of the radius of the separation chamber, wherein the first means comprise a plurality of members 14, arranged near the apex end 6.

According to one embodiment, a second flow deflection means comprising at least one member (14) in the path (13) of the liquid stream showing a decrease of the radius of the separation chamber, followed by an increase of the radius of the separation chamber is arranged at a distance L1 from the first means measured along the centre axis (12) wherein the distance L1 is in the interval $0.8D1 < L1 < 4D1$, where D1 is the diameter of the hydrocyclone housing 2 at the position where the second flow deflection means is arranged.

BRIEF DESCRIPTION OF DRAWINGS

The invention is now described, by way of example, with reference to the accompanying drawings, in which:

FIG. 3b is a cross section taken on line A-A of FIG. 3a.

FIG. 4b is a cross section taken on line B-B of FIG. 4a.

FIG. 5 is a sectional view of a hydrocyclone according to one embodiment including several flow deflecting means with settling zones there between.

FIG. 8b is a cross section taken on line C-C of FIG. 8a.

FIG. 8c is another embodiment taken from the same line C-C of FIG. 8a.

DESCRIPTION OF EMBODIMENTS

In the following, a detailed description of the invention is presented.

Figure 1:
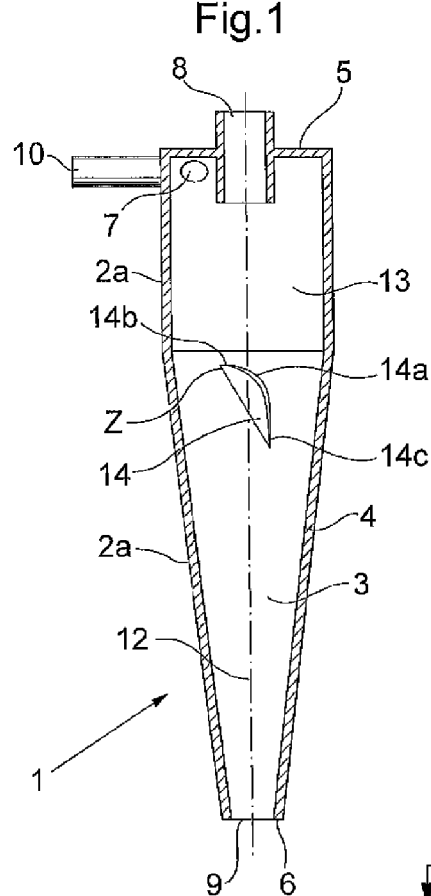
FIG. 1 shows a sectional view of a hydrocyclone according to one embodiment.

FIG. 1 shows a hydrocyclone 1 for separating a liquid mixture into a heavy fraction and a light fraction in a sectional view along a centre axis 12. The hydrocyclone 1 comprises a housing 2 forming an elongated separation chamber 3 having a smooth circumferential wall 4. Further, as presented in FIG. 1, the housing 2 may consist of a cylindrically shaped portion 2a, and a conical portion 2b. The hydrocyclone 1 has a base end 5 wherein an inlet member 7 is arranged via which a liquid mixture to be separated will be supplied preferably tangentially into the separation chamber 3 by means 10 for this purpose, such as a pump, in order to generate a liquid stream in the form of a helical vortex 11 about the centre axis 12. If desired, several inlet members may be arranged, for example one arranged at about the middle of the length of the hydrocyclone 1 (not shown).

The hydrocyclone 1 comprises an apex end 6 opposite the base end 5. At least two different outlet members are arranged. In an embodiment of the present invention, see FIG. 1, a first outlet member 8 is arranged for discharging the separated light fraction from the separation chamber 3 at the base end 5 and a second outlet member 9 is arranged for discharging the separated heavy fraction from the separation chamber 3 at the apex end 6. The helical vortex 11 extends from the base end 5 to the apex end 6.

In the inventive hydrocyclone 1 there is at least one flow deflection means, which comprises at least one member 14 in the path 13 of the liquid stream's helical vortex 11 in the smooth circumferential wall 4, showing a decrease of the radius of the separation chamber 3, followed by an increase of the radius of the separation chamber 3. The at least one member 14, may further comprise a rounded curve portion 14a, a rack portion 14b and a ledge portion 14c. The rounded curve portion 14a is preferably defined by r, corresponding to the radius of the rounded curve at a specific point along the rounded curve portion 14a, and angle μ, corresponding to the angle between the radii as defined in the starting point of the rounded curve at the end of the rack portion 14b and the ending point of the rounded curve portion at the beginning of ledge portion 14c, as can further be seen in FIG. 7a. The radius r is preferably in the interval of $0.1D_0 < r < D_0$, but more preferably in the interval of $0.12D_0 < r < 0.5D_0$, where $D_0$ is the diameter of the hydrocyclone housing at the position where the flow deflecting means is arranged. The radius r may have constant values along the rounded curve portion 14a. The radius r may also be non-constant along the rounded curve portion, thus corresponding to a continuous function of the position along the rounded curve portion 14a. The angle μ is in the interval $0° < \mu < 120$, preferably in the interval $15° < \mu < 120°$, more preferably in the interval $30° < \mu < 90°$. As is shown in FIG. 1, the rounded curve portion 14b, is smoothly connected to the rack portion 14b, essentially extending in the direction of the path 13 of the liquid stream, i.e. helical vortex 11, in one end, and smoothly connected to the ledge portion 14c essentially extending in a direction towards the apex end 6, in the other end. The flow deflection means may be arranged at any level, i.e. distance from the apex end 6, in the smooth circumferential wall 4 along the centre axis 12 of the hydrocyclone 1, including the cylindrical portion 2a and the conical portion 2b of the hydrocyclone housing 2. Preferably, the flow deflection means is arranged at the beginning of the conical portion 2b of the hydrocyclone housing 2. This position essentially corresponds to a middle position of the hydrocyclone, i.e. the distance from the flow deflection means to the inlet member 7 and to the apex end 6 being essentially equal.

Figure 2:
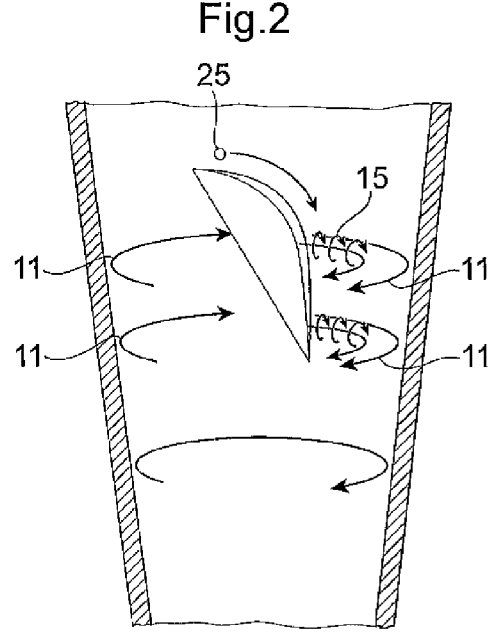
FIG. 2 shows functional features in an embodiment of the invention.

When the helical vortex 11 flow along the circumferential wall 4 of the separation chamber 3 it will reach the inclined member 14 and a secondary vortex 15 is formed due to a pressure drop occurring after the member 14, see FIG. 2. The secondary vortex 15 has a component of flow radially outwards and a component of flow towards the apex end 6 transporting the relatively heavier particles 25 at the circumferential wall 4 of the separation chamber 3 radially outwards and towards the heavy fraction outlet 9 at the apex end 6. A third vortex (not shown) is generated along the rounded curve portion as the flow passes the inclined member 14, the third vortex will spiral down in an axial direction towards the apex end 6 and further transport the relatively heavier particles 25 in this direction.

The heavy reject particles 25, closest to the circumferential wall 4, will land on the rack portion 14b, and due to the rounded curve portion, the heavy particles will feel the suction drag force from the axial component of the secondary vortex 15. This suction drag which will transport the heavy reject particles along the rack portion 14b, along the curved portion 14a and along the ledge portion 14c. As the helical vortex 11 spirals down and flows over the ledge portion 14c and thus a decreasing radius of the circumferential wall, two positive results are achieved. Firstly, the conservation of angular momentum will implicate an increase of the speed flow which will induce a controlled turbulence which minimizes the fibre losses and manipulates the elongation of the fibres such that fibre/particle agglomerates are forced to break up and release particles previously bound to the fibres. Secondly, the remixing of the already separated heavy particles is avoided since the helical vortex 11 stream is deflected away from the particles thus increasing the separation efficiency.

Figure 3A:
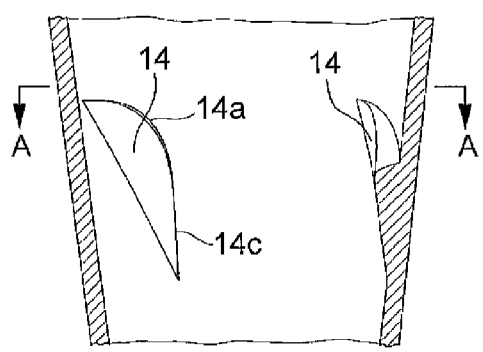
FIG. 3a shows a sectional view of a hydrocyclone according to one embodiment including a plurality of members.
Figure 3B:
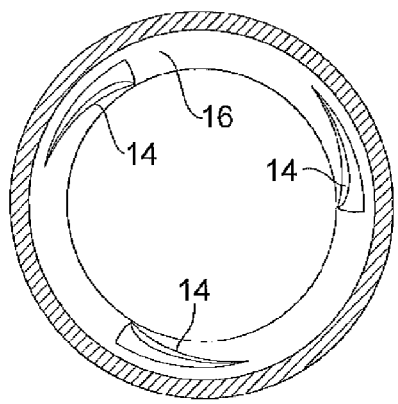
Figure 3C:
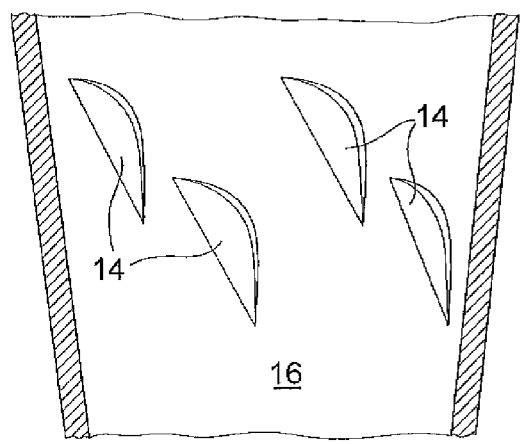
FIG. 3c shows a sectional view of a hydrocyclone according to one embodiment including a plurality of members arranged in an alternating manner in the housing.

According to another preferred embodiment of the invention as shown in FIG. 3a, a plurality of members 14, identical or with various shapes, are arranged on one and the same level in an axial direction of the centre axis 12, e.g. having the same distance to the apex end 6. FIG. 3a-3b shows one embodiment with three members 14, although only FIG. 3b explicitly shows the third member 14. Other embodiments including more as well as fewer members 14 are possible. The members 14 are not arranged in direct connection to each other, but a smooth surface portion 16 of the circumferential wall 4 between the members 14, connects them. The smooth surface between the members will function as a settling zone for the third vortex which will further limit the disturbance, i.e. negative impact, a directly arranged subsequent member would have on the shape of the third vortex, and thus its capability to transport heavier particles toward the apex end 6. Further, from FIG. 2 it can be noted that the members 14 are of relatively small dimensions and in order to limit the negative implication on the separation efficiency, these members 14 should have an extension length along the circumferential wall 4 that is less than ¼ of the total circumference of the circumferential wall 4 measured at the axial position of the member 14 along the centre axis 12. As seen in FIG. 3c, according to another embodiment, the plurality of members may be arranged essentially in one and the same level in an axial direction of the centre axis 12, but the members still being arranged in an alternating level in the axial direction of the centre axis 12, such that the every second member are slightly closer to the apex end whereby they still overlap each other in a circumferential direction.

Figure 4A:
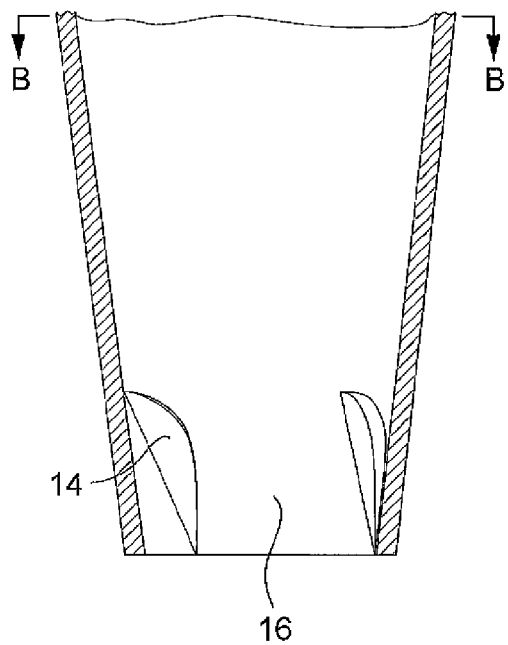
FIG. 4a shows a sectional view of a hydrocyclone according to one embodiment wherein at least one member is arranged at the apex end.
Figure 4B:
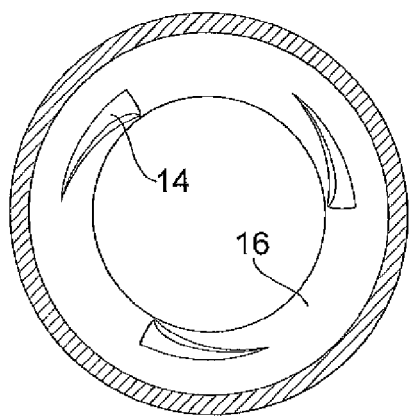

According to another embodiment as shown in FIG. 4a-b at least one member 14, but preferably several members 14, are arranged near the apex end 6 of the hydrocyclone 1, preferably at the apex end 6. This location of the at least one member 14 boost the speed of the stock or liquid mixture due to the conservation of the angular momentum and therefore create and extra driving force for the stock to exit through the apex end. This will thus further decreases the risk of plugging as well as decrease the amount of fibre rejected.

Figure 5:
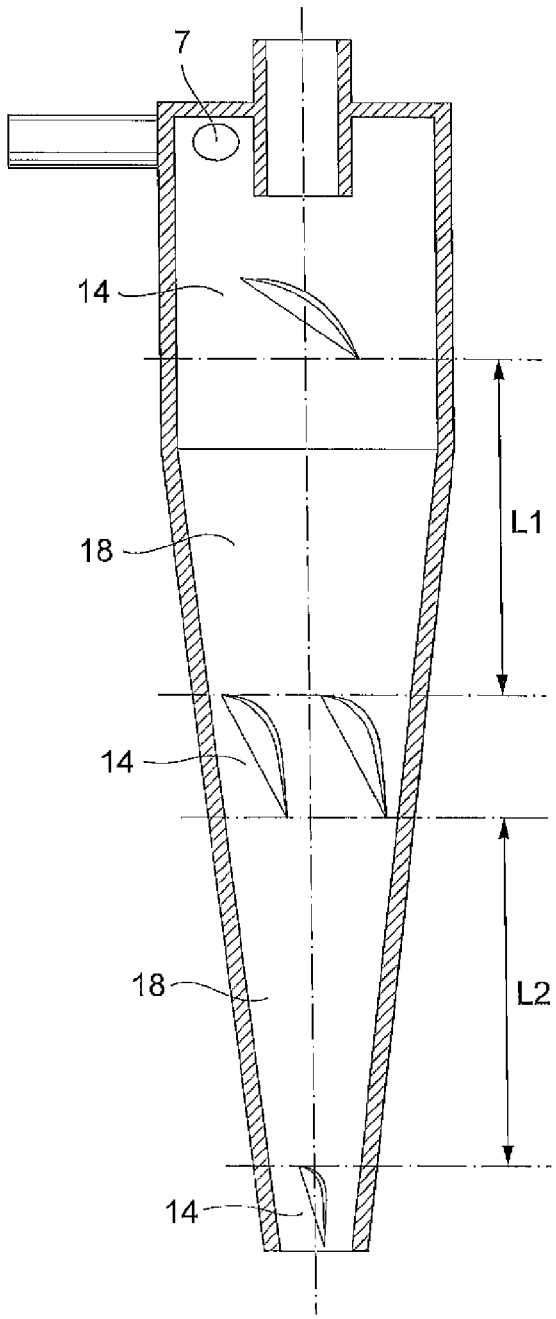

According to another embodiment, as shown in FIG. 5, a second flow deflection means, including at least one member 14 is arranged at a distance L1 from the first flow deflection means including at least one member 14 arranged near the apex end 6, preferably at the apex end 6 in an axial direction extending between the apex end 6 and the base end 5 along the centre axis 12. L1 is preferably in the interval $0.8D1<L1<4D1$, where D1 is the diameter of the hydrocyclone housing 2 at the position where the second flow deflection means is arranged. In a preferred embodiment, the distance between two members are at least 2 times the axial extension of the second member. This second flow deflection means, may be arranged between the first flow deflecting means and a third flow deflection means including at least one member 14 arranged close to the inlet member 7 of the hydrocyclone 1, or at the beginning of the conical portion, and located at a second distance L2 from the third flow deflection means measured along the centre axis 12. L1 and L2 may be equal, but preferably L2 is in the interval $0.8D2<L2<4D2$, where D2 is the diameter of the hydrocyclone housing at the axial position where the third flow deflection means is arranged, or at least 2 times the axial extension of the third member. The smooth surface of the circumferential wall 4, along the distance L1 or L2, is a settling zone 18 of less turbulence between the flow deflection means, with the purpose to give residual time for the particles that has separated from the fibers over the members 14 to settle and thereby prevent them from being remixed with the light fraction. To further ease the exiting of the rejected pulp, the relative height of the members towards the center axis 12, in relation to the housing 2 radius, is higher for the member arranged at the apex end than for members arranged farther away from the apex end 6.

Figure 6:
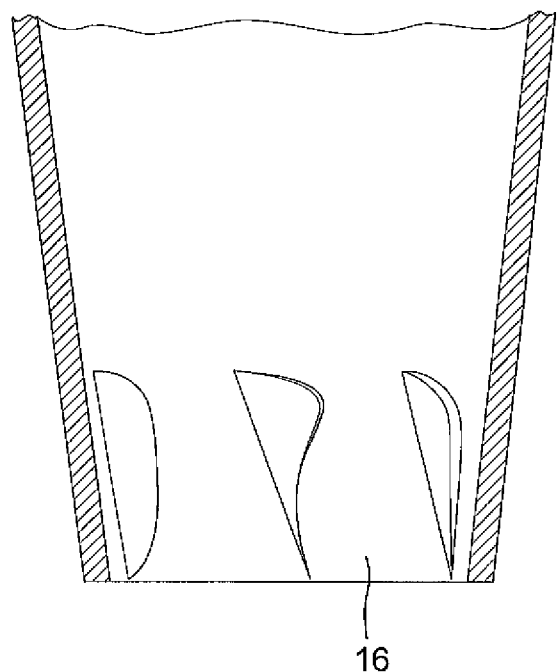
FIG. 6 is a sectional view of a hydrocyclone according to one embodiment wherein several arbitrary members are arranged at the apex end.

According to another embodiment, as shown in FIG. 6 several members 14 of arbitrary form are arranged at the apex end 6 of a hydrocyclone 1, connected by a smooth surface portion 16 of the circumferential wall 4.

Figure 7A:
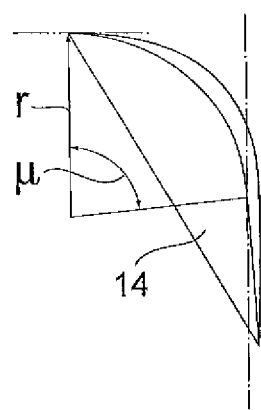
FIG. 7a-c shows various entering and release angles α and β of a member in a hydrocyclone according to the invention.
Figure 7B:
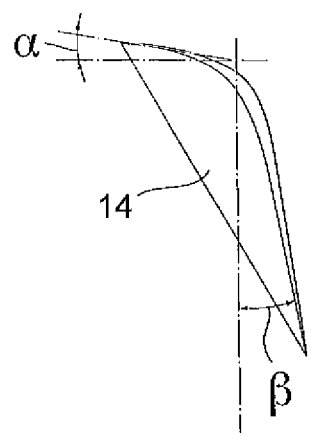
Figure 7C:
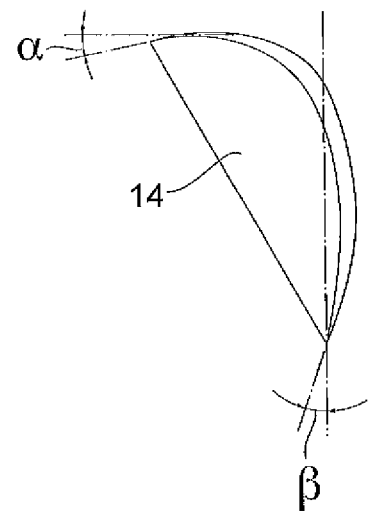

FIG. 7a-c shows additional embodiments of the invention, including various entering angles α and release angles β of the member 14. The entering angle α is defined as the angle between the tangent of the end of rack portion 14b and a plane normal to the centre axis 12. The release angle β is defined as the angle between the tangent of the end of the ledge portion and a plane extending through the centre axis 12. The entering angle α is preferably in the interval $-15°<α<80°$, more preferably in the interval $0°<α<45°$, and the release angle β is preferably in the interval of $-15°<β<60°$, more preferably in the interval $0°<α<45°$. In FIG. 7a, angles α and β are 0°. In FIG. 7b angles α and β are >0°. In FIG. 7c angles α and β are <0°. A smaller value of α increase the surface towards flow of heavier particles 25, which increases the number of heavier particles that will land on the rack portion 14b. However this must be balanced against the effect that a larger drag force will be needed to transport the heavier particles along the rack portion and further. Due to the decreasing speed of the helical vortex 11 further down in the hydrocyclone, and the consequently lower drag force generated, it is preferred to arrange members with higher α closer to the apex end 6 than those members farther away from the apex end 6.

Figure 8A:
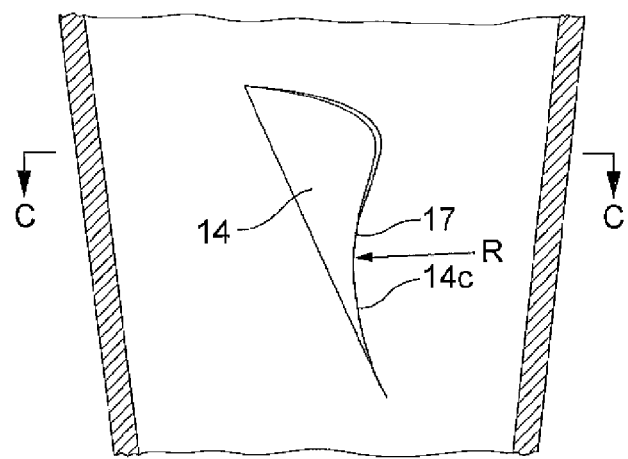
FIG. 8a shows a sectional view of a hydrocyclone according to one embodiment having a member with a curved ledge portion.
Figure 8B:
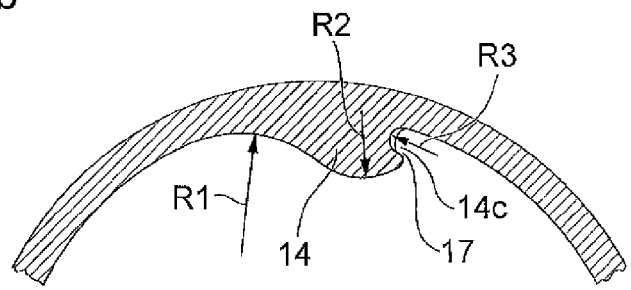
Figure 8C:
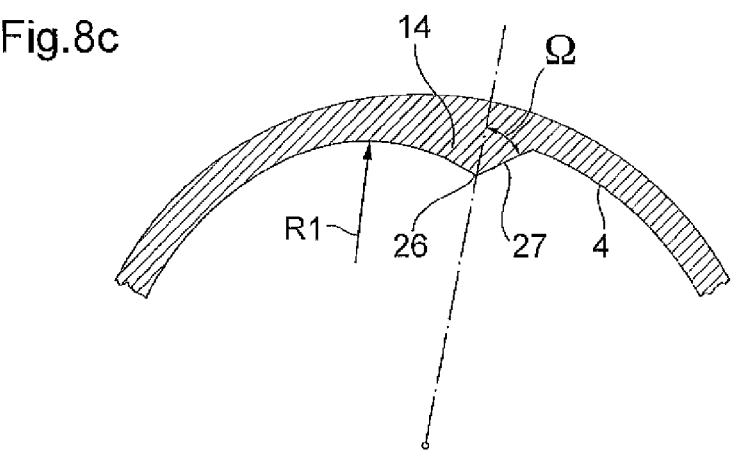

FIG. 8a shows a member 14 having a ledge portion 14c with a curvature 17 corresponding to a radius R of a circle. This radius R is preferably larger than r of the rounded curve portion, i.e. $R>r$. The curvature prolongs the length of the rack portion 14c, and thus the distance along which the second and third vortexes are allowed to spiral and generate a drag force for the transport of the heavy particles without shortening the lengths L1, L2 of the smooth surfaces between the flow deflecting members. FIG. 8b shows the curvature of a member 14 as viewed from an axial direction. Three additional radii are defined, R1 defines a decreasing radius of the separation chamber, R2 defines the smoothly rounded member following the decreasing radius R1, and R3 shows the curvature of a member 14 as viewed from an axial direction corresponding to a portion of a pipe along the rack portion 14c. A smoothly rounded member in combination with a decreasing radius of the separation chamber will decrease the risk that the turbulence generated is too strong and that heavy particles are remixed with the light fraction. The portion of a pipe creates a spiral path for the third helical vortex and the heavy particles 25, and create shielding effect against the helical vortex which further prevents the remixing of separated heavy particles with the light accept fraction. The radii may have various lengths, however in a preferred embodiment, $R1<D/2$, where D is the diameter of the hydrocyclone housing 2 at the position where the flow deflection means is arranged, and $R2<R1$ and $R3<R2$. FIG. 8c shows yet another embodiment of the invention, wherein R2 and R3 is replaced by an edge 26 interconnecting radius R1 with an essentially flat portion 27 that is connected to the circumferential wall 4. An angle Ω is defined as the extension direction of the portion 27 to an imaginary radial line extending from the center of the housing 2 through edge 26. Preferably Ω is in the interval $-45°<Ω<45°$.

The invention claimed is:
1. A hydrocyclone for separating a liquid mixture into a heavy fraction including heavy particles and a light fraction, comprising a housing forming an elongated separation chamber having a circumferential wall, a base end, an apex end, at least one inlet member at the base end for supplying a liquid mixture into the separation chamber, a first outlet member for discharging separated light fraction from the separation chamber at the base end, a second outlet member for discharging separated heavy fraction from the separation chamber at the apex end, means for supplying the liquid mixture to the separation chamber via the at least one inlet member, so that during operation a liquid stream is generated as a helical vortex about a center axis in the separation chamber, said helical vortex extending from the base end to the apex end, a first flow deflection means arranged in the circumferential wall which comprises at least one member in the path of the liquid stream showing a decrease of the radius of the separation chamber, followed by an increase of the radius of the separation chamber, wherein the at least one member comprises a rounded curve portion for transporting the heavy particles.

2. A hydrocyclone according to claim 1, wherein the rounded curve portion is defined by a radius r, corresponding to the radius of the rounded curve at a specific point along the rounded curve portion, wherein the radius r is preferably in the interval of $0.1D0<r<D0$, where D0 is the diameter of the hydrocyclone housing at the position where the flow deflection means is arranged.

3. A hydrocyclone according to claim 1, wherein the rounded curve portion is connected to a rack portion essentially extending in the direction of the path of the liquid stream.

4. A hydrocyclone according to claim 3, wherein the rounded curve portion is defined by an angle μ, corresponding to the angle between the radii as defined in the starting point of the rounded curve at the end of the rack portion and the ending point of the rounded curve portion at the beginning of ledge portion, wherein the angle μ is in the interval $0°<μ<120$, preferably in the interval $15°<μ<120°$, more preferably in the interval $30°<μ<90°$.

5. A hydrocyclone according to claim 3, wherein an angle α between the tangent of the end of rack portion and a plane normal to the centre center axis is in the interval $-15°<α<80°$.

6. A hydrocyclone according to claim 1, wherein the rounded curve portion is connected to a ledge portion essentially extending in a direction towards the apex end of the hydrocyclone.

7. A hydrocyclone according to claim 6, wherein an angle β between the tangent of the end of the ledge portion and a plane extending through the centre axis is in the interval $-15°<β<60$.

8. A hydrocyclone according to claim 6, wherein the ledge portion has a curvature corresponding to a radius R of a circle, wherein the radius R is preferably larger than r.

9. A hydrocyclone according to claim 6, wherein the ledge portion is defined by three radii R1-R3 when viewed from an axial direction, wherein $R1<D/2$, where D is the diameter of the hydrocyclone housing at the position where the flow deflection means is arranged, and $R2<R1$ and $R3<R2$.

10. A hydrocyclone according to claim 6, wherein the ledge portion is defined by a radius R1 when viewed from an axial direction, wherein $R1<D/2$, where D is the diameter of the hydrocyclone housing 2 at the position where the flow deflection means is arranged, wherein an edge interconnects radius R1 with an essentially flat portion that is connected to the circumferential wall 4, and wherein an angle Ω is defined as the extension direction of the portion to an imaginary radial line extending from the center of the housing through edge, wherein Ω preferably is in the interval $-45°<Ω<45°$.

11. A hydrocyclone according to claim 1, wherein the first flow deflection means comprises a plurality of members arranged at the same level in the housing and connected by a smooth surface portion of the circumferential wall.

12. A hydrocyclone according to claim 1, wherein each member has an extension length along the circumferential wall that is less than ¼ of the total circumference of the circumferential wall measured at the axial position of the member.

13. A hydrocyclone according to claim 1 wherein the first flow deflection means is arranged at the apex end.

14. A hydrocyclone according to claim 1 wherein a second flow deflection means is arranged at a distance L1 from the first flow deflection means measured along the center axis, wherein the distance L1 is in the interval $0.8D1<L1<D1$, where D1 is the diameter of the hydrocyclone housing at the position where the second flow deflection means for flow deflection is arranged.

15. A hydrocyclone for separating a liquid mixture into a heavy fraction including heavy particles and a light fraction, comprising a housing forming an elongated separation chamber having a circumferential wall, a base end, an apex end, at least one inlet member at the base end for supplying a liquid mixture into the separation chamber, a first outlet member for discharging separated light fraction from the separation chamber at the base end, a second outlet member for discharging separated heavy fraction from the separation chamber at the apex end, means for supplying the liquid mixture to the separation chamber via the at least one inlet member, so that during operation a liquid stream is generated as a helical vortex about a center axis in the separation chamber, said helical vortex extending from the base end to the apex end, a first flow deflection means arranged in the circumferential wall which comprises at least one member in the path of the liquid stream showing a decrease of the radius of the separation chamber, followed by an increase of the radius of the separation chamber, wherein the first flow detection means comprises a plurality of members arranged near the apex end.

16. A hydrocyclone for separating a liquid mixture into a heavy fraction including heavy particles and a light fraction, comprising a housing forming an elongated separation chamber having a circumferential wall, a base end, an apex end, at least one inlet member at the base end for supplying a liquid mixture into the separation chamber, a first outlet member for discharging separated light fraction from the separation chamber at the base end, a second outlet member for discharging separated heavy fraction from the separation chamber at the apex end, means for supplying the liquid mixture to the separation chamber via the at least one inlet member, so that during operation a liquid stream is generated as a helical vortex about a center axis in the separation chamber, said helical vortex extending from the base end to the apex end, a first flow deflection means arranged in the circumferential wall which comprises at least one member in the path of the liquid stream showing a decrease of the radius of the separation chamber, followed by an increase of the radius of the separation chamber, wherein a second flow deflection means comprising at least one member in the path of the liquid stream showing a decrease of the radius of the separation chamber, followed by an increase of the radius of the separation chamber is arranged at a distance L1 from the first flow detection means measured along center axis wherein the distance L1 is in the interval $0.8D1<L1<D1$, where D1 is the diameter of the hydrocyclone housing at the position where the second flow deflection means is arranged.

\* \* \* \* \*

UNITED STATES PATENT AND TRADEMARK OFFICE
CERTIFICATE OF CORRECTION

PATENT NO. : 8,789,709 B2  
APPLICATION NO. : 14/115537  
DATED : July 29, 2014  
INVENTOR(S) : Jan Backman, Valentina Kucher and Bjorn Tidbeck Page 1 of 1

It is certified that error appears in the above-identified patent and that said Letters Patent is hereby corrected as shown below:

In the Claims

Column 10, line 6, cancel the text "0.8D1<L1<D1" and insert the text --0.8D1<L1<4D1--

Column 10, line 54, cancel the text "0.8D1<L1<D1" and insert the text --0.8D1<L1<4D1--

Signed and Sealed this  
Fourteenth Day of July, 2015

Michelle K. Lee  
*Director of the United States Patent and Trademark Office*